(12) United States Patent
Levin et al.

(10) Patent No.: US 12,471,524 B2
(45) Date of Patent: Nov. 18, 2025

(54) SINGLE LINE WEED VEGETATION TRIMMER AND/OR EDGER WITH CONTINUOUS LINE FEED

(71) Applicant: MTD PRODUCTS INC, Valley City, OH (US)

(72) Inventors: Shalom Levin, Pardesly (IL); Assaf Levin, Pardesly (IL); Shai Abramson, Pardesly (IL)

(73) Assignee: MTD PRODUCTS INC, Valley City, OH (US)

( * ) Notice: Subject to any disclaimer, the term of this patent is extended or adjusted under 35 U.S.C. 154(b) by 121 days.

(21) Appl. No.: 17/862,980

(22) Filed: Jul. 12, 2022

(65) Prior Publication Data
US 2023/0011491 A1    Jan. 12, 2023

Related U.S. Application Data

(60) Provisional application No. 63/220,730, filed on Jul. 12, 2021.

(51) Int. Cl.
*A01D 34/416*        (2006.01)

(52) U.S. Cl.
CPC .............................. *A01D 34/4162* (2013.01)

(58) Field of Classification Search
CPC ............. A01D 34/4163; A01D 34/062; A01D 34/4162; A01D 34/4161
USPC .......................................................... 30/276
See application file for complete search history.

(56) References Cited

U.S. PATENT DOCUMENTS

| | | | |
|---|---|---|---|
| 4,138,810 A | | 2/1979 | Pittinger, Sr. et al. |
| 4,271,594 A | * | 6/1981 | Kilmer ............... A01D 34/4161 30/276 |
| 4,285,128 A | * | 8/1981 | Schnell .............. A01D 34/4161 30/276 |
| 4,852,258 A | | 8/1989 | Foster |
| 2006/0218797 A1 | * | 10/2006 | Mitchell, Jr. ...... A01D 34/4161 30/276 |
| 2009/0217637 A1 | * | 9/2009 | Dunn ................... A01D 34/416 56/13.6 |
| 2016/0249529 A1 | * | 9/2016 | Ma ..................... A01D 34/4161 30/276 |
| 2019/0183040 A1 | * | 6/2019 | Simmons ........... A01D 34/4161 |
| 2020/0008348 A1 | | 1/2020 | Guo et al. |

FOREIGN PATENT DOCUMENTS

EP          3143860 A1 *  3/2017   ......... A01D 34/4163

OTHER PUBLICATIONS

International Search Report & Written Opinion for International Application No. PCT/US2022/036811, dated Oct. 28, 2022, 14 pages long.

\* cited by examiner

*Primary Examiner* — Nhat Chieu Q Do
(74) *Attorney, Agent, or Firm* — Wegman Hessler Valore

(57) ABSTRACT

A line trimmer or edger includes a trimmer head configured to rotate a portion of a trimmer line comprising a cutting end of the trimmer line; a trimmer motor configured to drive the rotation of the trimmer head; a continuous line feed mechanism configured to continuously feed the trimmer line into the trimmer head while the continuous line feed mechanism is active; and one or more line feed activation mechanisms configured to control an activation and a deactivation of the continuous line feed mechanism.

13 Claims, 12 Drawing Sheets

SINGLE LINE WEED VEGETATION TRIMMER AND/OR EDGER WITH CONTINUOUS LINE FEED

CROSS REFERENCE TO RELATED APPLICATIONS

This application claims the benefit of U.S. Provisional Application No. 63/220,730, filed Jul. 12, 2021 and titled SINGLE LINE WEED AND VEGETATION TRIMMER AND/OR EDGER WITH CONTINUOUS LINE FEED which is hereby incorporated by reference herein in its respective.

FIELD OF DISCLOSURE

This application relates generally to equipment for trimming and/or edging weeds and vegetation, and more specifically to equipment having a single line for trimming and/or edging that is capable of continuous feeding of the line.

BACKGROUND

String or line trimmers use a length of line or wire attached to a rapidly rotating trimmer head to cut weeds and/or vegetation with the string or line. Line trimmers generally employ two trimming lines on opposite ends of the trimmer head, where the two lines are opposing ends of a single line hand-wound onto a reel. As the line wears or breaks, additional line can be dispensed by depressing a button on the bottom of the trimmer head by bumping the trimmer head on the ground with sufficient force. This type of line feed mechanism (also referred to as "bump-feed") has also been employed on string trimmers with a single cutting end.

SUMMARY

The following presents a simplified summary in order to provide a basic understanding of some example aspects of the disclosure. This summary is not an extensive overview. Moreover, this summary is not intended to identify critical elements of the disclosure nor delineate the scope of the disclosure. The sole purpose of the summary is to present some concepts in simplified form as a prelude to the more detailed description that is presented later.

According to one aspect, a first example single line trimmer is disclosed. The first example single line trimmer comprises: a trimmer head configured to rotate a portion of a trimmer line comprising a cutting end of the trimmer line; a trimmer motor configured to drive the rotation of the trimmer head; a continuous line feed mechanism configured to continuously feed the trimmer line into the trimmer head while the continuous line feed mechanism is active; and one or more line feed activation mechanisms configured to control an activation and a deactivation of the continuous line feed mechanism.

To accomplish the foregoing and related ends, certain illustrative aspects of the disclosure are described herein in connection with the following description and the drawings. These aspects are indicative, however, of but a few of the various ways in which the principles of the disclosure can be employed and the subject disclosure is intended to include all such aspects and their equivalents. Other advantages and features of the disclosure will become apparent from the following detailed description of the disclosure when considered in conjunction with the drawings.

BRIEF DESCRIPTION OF THE DRAWINGS

The foregoing and other aspects of the present disclosure will become apparent to those skilled in the art to which the present disclosure relates upon reading the following description with reference to the accompanying drawings, in which.

Figure 1:
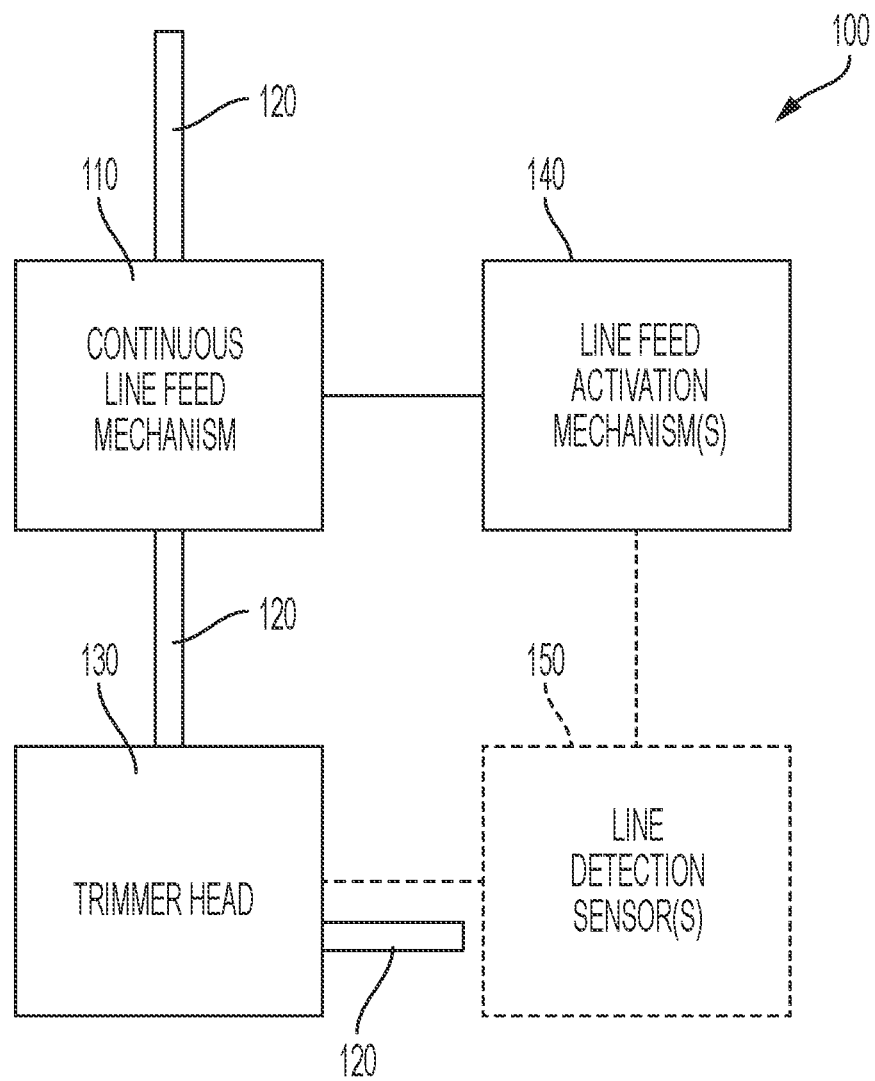
FIG. 1 illustrates an example system employable in a line trimmer, according to various aspects discussed herein.

It should be noted that the drawings are diagrammatic and not drawn to scale. Relative dimensions and proportions of parts of the figures have been shown exaggerated or reduced in size for the sake of clarity and convenience in the drawings. The same reference numbers are generally used to refer to corresponding or similar features in the different embodiments, except where clear from context that same reference numbers refer to disparate features. Accordingly, the drawings and description are to be regarded as illustrative in nature and not as restrictive.

While specific embodiments of the disclosure pertaining to single line trimmers having continuous line feed are described herein, it should be understood that the disclosed systems, methods, and a apparatuses are not so limited and modifications may be made without departing from the scope of the present disclosure. The scope of the systems, methods, and apparatuses are defined by the appended claims, and all devices, processes, and methods that come within the meaning of the claims, either literally or by equivalence, are intended to be embraced therein.

DETAILED DESCRIPTION

Example embodiments that incorporate one or more aspects of the present disclosure are described and illustrated in the drawings. These illustrated examples are not intended to be a limitation on the present disclosure. For example, one or more aspects of the present disclosure can be utilized in other embodiments and even other types of devices. Moreover, certain terminology is used herein for convenience only and is not to be taken as a limitation on the present disclosure. Still further, in the drawings, the same reference numerals are employed for designating the same elements.

Referring to FIG. 1, illustrated is an example system employable in a line trimmer (reference herein to trimmer(s) is intended to encompass trimmer(s), edger(s), and combination or convertible edger(s)/trimmer(s)), according to various aspects discussed herein. System 100 can be employed in a hand-held trimmer or a trimmer attached to an outdoor power equipment (e.g., a lawn maintenance device such as a mower, etc.). System 100 can comprise continuous line feed mechanism 110, trimmer head 130, can optionally include the trimmer motor (not shown in FIG. 1), one or more line feed activation mechanisms 140, and optionally one or more line detection sensors 150.

Continuous line feed mechanism 110 configured to continuously feed (e.g., while activated) trimmer line 120 (e.g., monofilament line, etc.) into and through trimmer head 130. Depending on the embodiment, any of a variety of mechanisms can be employed for feeding trimmer line 120, including but not limited to a pair of gears and/or wheels driven by a line feed motor and discussed below in connection with the example embodiment. In various embodiments, continuous line feed mechanism 110 can also be controlled by a release mechanism (not shown in FIG. 1, e.g., a mechanism that widens the gap between the gears/wheels in embodiments employing gears/wheels, etc.) that can allow a user to readily remove, insert, or replace trimmer line 120, in contrast to the laborious process of reloading the trimmer line in existing line trimmers. In various embodiments, continuous line feed mechanism 110 can comprise any of a variety of mechanisms that grip the trimmer line 120 when not activated and release trimmer line 120 when activated.

As an additional example, a non-motorized technique can be employed additionally or alternatively to motorized techniques, wherein trimmer line 120 is either gripped or released by continuous line feed mechanism (e.g., via a manual button, lever, etc.), and centrifugal force on the cutting end of trimmer line 120 (e.g., due to its rotation with trimmer head 130, etc.) can be the force used to advance trimmer line 120, for example, until trimmer line 120 is long enough to be cut by a trimming blade and/or detected via a line detection sensor 150 (e.g., which can stop feeding of trimmer line 120 and/or provide a user alert, for example, via feedback that is one or more of visual, auditory, haptic, etc.).

Initial insertion of trimmer line 120 can be done when the trimmer head is rotating at a very low speed (e.g., around 200 RPM, etc.). In various embodiments, manually operating a line motor feeder of continuous line feed mechanism 110 can first rotate the trimmer head 130 and then the feeder motor can be activated.

Line 120 can exit trimmer head 130 through a small aperture or eyelet of trimmer head 130, which can be located on a side and/or lower face (e.g., offset from the center, etc.) of trimmer head 130. In operation in a line trimmer, a trimmer motor (not shown in FIG. 1) of the line trimmer can rotate trimmer head 130 at a high rate (e.g., several thousand revolutions per minute (RPM), for example, around 8,000 RPM, 6,000-10,000 RPM, etc.), causing a cutting end of trimmer line 120 to rotate rapidly enough to cut weeds and other vegetation. Because line 120 can exit trimmer head 130 offset from the center, there is the potential for an imbalanced load on trimmer head 130 as it rotates, trimmer head 130 can comprise a counterweight on the opposite side of trimmer head 130 as the rotating cutting end of trimmer line 120 to offset the load imbalance.

Line feed activation mechanism(s) 140 can comprise a user-activated (e.g., manual) control (e.g., switch, button, etc.) that can activate and/or deactivate continuous line feed mechanism 110 (e.g., contained within a handle of a handheld line trimmer embodiment, or with other user controls of an embodiment attached to lawn maintenance equipment, etc.). Additionally or alternatively, in embodiments comprising line detection sensor(s) 150, line feed activation mechanism(s) 140 can comprise circuitry that can automatically activate continuous line feed mechanism 110 when the cutting end of trimmer line 120 is not detected as being at a sufficient length or diameter (e.g., length such that an excess portion is trimmed by a blade on the bottom of the line trimmer, a threshold length, long enough to trigger line detection sensor(s), long enough to balance out a fixed counterweight, etc.), and can automatically deactivate continuous line feed mechanism 110 when the cutting end of trimmer line 120 is detected as being at a sufficient length or diameter.

Line detection sensor(s) 150 can comprise one or more sensors for detecting the rotating cutting end of trimmer line 120, which can comprise any of a variety of types of sensors, including but not limited to example sensors discussed herein.

In one example, an optical sensor can detect when the cutting end of trimmer line 120 passes through a detection area (e.g., by breaking a beam of the sensor, etc.). Because the cutting end of trimmer line 120 rotates at a known frequency based on the motor of the line trimmer, spectral analysis (e.g., via fast Fourier transform, etc.) of data from the optical sensor to identify signals with the frequency of rotation of the cutting end of trimmer line 120 can ensure the optical sensor was triggered by the cutting end of trimmer line 120 and not debris (e.g., weed and vegetation trimmings, etc.).

In another example, an accelerometer employed as a vibration sensor can detect when the cutting end of trimmer line 120 is of sufficient length via the cutting end of trimmer line 120 passing near or striking a surface on which the accelerometer is mounted (e.g., on or near the blade for trimming the cutting end of trimmer line 120, or any other surface at or near that radius from the center of the trimmer, etc.), which can include optionally employing spectral analysis as discussed above.

In a further example, an acoustic sensor can detect when the cutting end of trimmer line 120 is of sufficient length based on analyzing the sound (e.g., frequency and/or intensity/volume (overall or at one or more frequencies)) received at the acoustic sensor, which can include optionally employing spectral analysis as discussed above.

As another example, an accelerometer on trimmer head 130 can be employed to sense hits of the trimmer line 120 as it touches a cutting or trimming blade. In various embodiments, a cutting or trimming blade can be employed as a backup or a redundancy, with a sensor 150 to detect the cutting end of trimmer line 120 before it is at a diameter sufficient to hit the cutting or trimming blade. In various embodiments employing a motorized continuous line feed mechanism 110, in the event of impact of the cutting end of trimmer line 120 and the trimming blade, continuous line feed mechanism 110 can reverse trimmer line 120 a short distance in order to reduce torque and noise.

Trimmer line 120 can pass into trimmer head 130 from a hollow shaft which trimmer line 120 can be fed into by continuous line feed mechanism 110. In some embodiments, this hollow shaft can be the shaft of the trimmer motor that rotates trimmer head 130. In other embodiments, it can be a separate hollow shaft.

Because trimmer line 120 is not entirely contained within (and thereby able to freely rotate with) trimmer head 130, torsion will be applied to the cutting end of trimmer line 120 that rotates with trimmer head 130 during operation of the line trimmer unless the cutting end of trimmer line 120 is able to rotate to untwist itself from any torsion. In various embodiments, trimmer head 130 can comprise bearings and/or lubrication that can allow the cutting end of trimmer line 120 to rotate freely around its long axis, such that it can untwist as it rotates with trimmer head 130, to prevent or undo any applied torsion, in a manner that reduces friction on (and resultant heating of) trimmer line 120.

Additionally, a portion of trimmer line 120 within trimmer head 130 can be guided to an eyelet of trimmer head 130 by passing through a spring or other flexible hollow sleeve in which that portion of trimmer line 120 can rotate freely, and which itself can either rotate entirely with trimmer head 130 or can also rotate freely (e.g., via bearings, etc.) to counteract any twist and/or torsion that would otherwise result. A large spool diameter combined with semi straight line can be employed to reduce this twist oscillation.

A reserve portion of trimmer line 120 can comprise a wound or spooled portion in a container (e.g., which can be removed and refilled or replaced) and/or an unwound (e.g., approximately straight) straight portion (e.g., passing through a hollow region within, for example, a handle (e.g., for handheld line trimmers) or connector to lawn maintenance equipment (e.g., for embodiments attached to lawn maintenance equipment), etc.).

Figure 2:
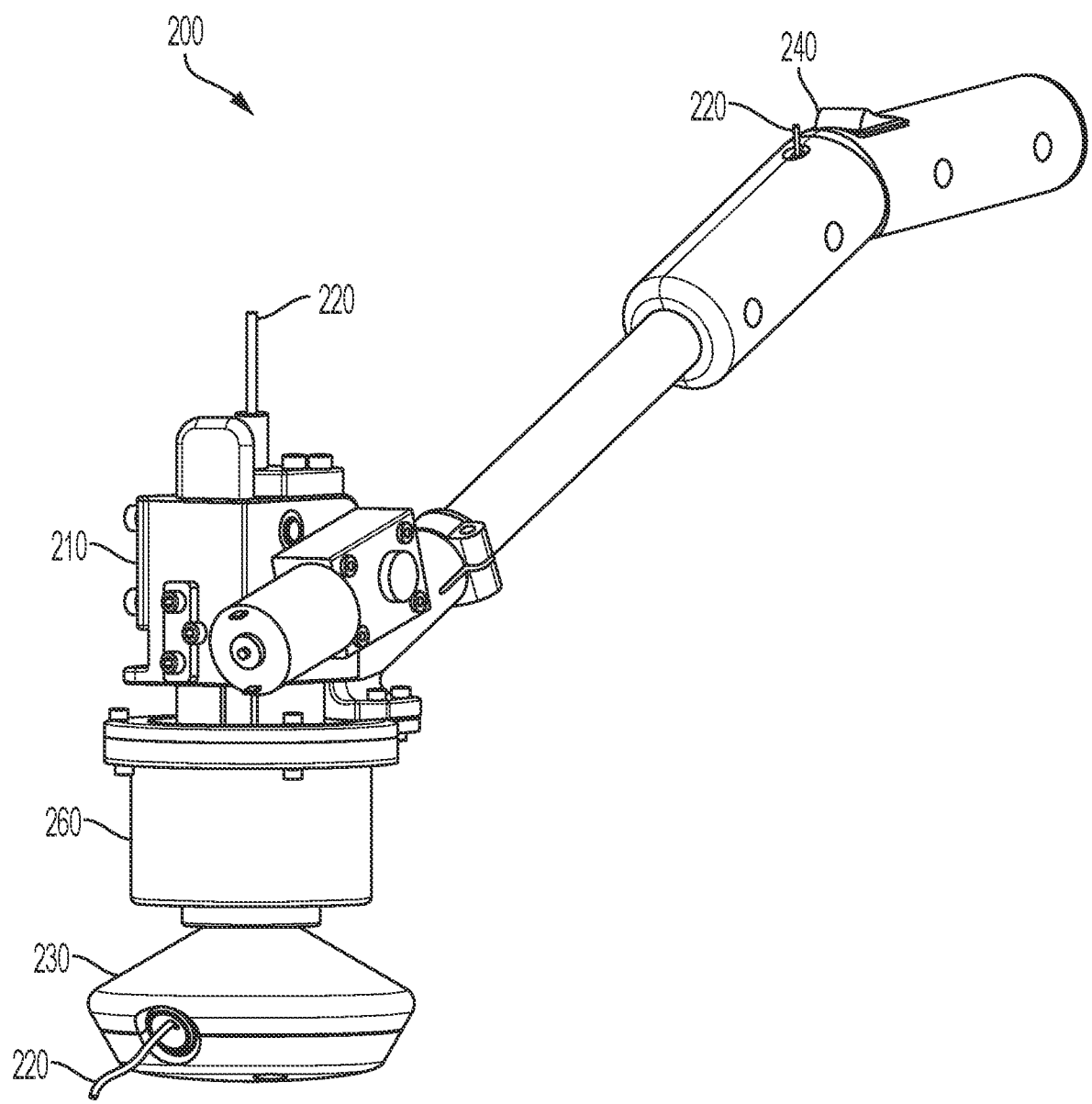
FIG. 2 illustrates a first side view of a first example embodiment of a single line trimmer, according to various aspects discussed herein.
Figure 3:
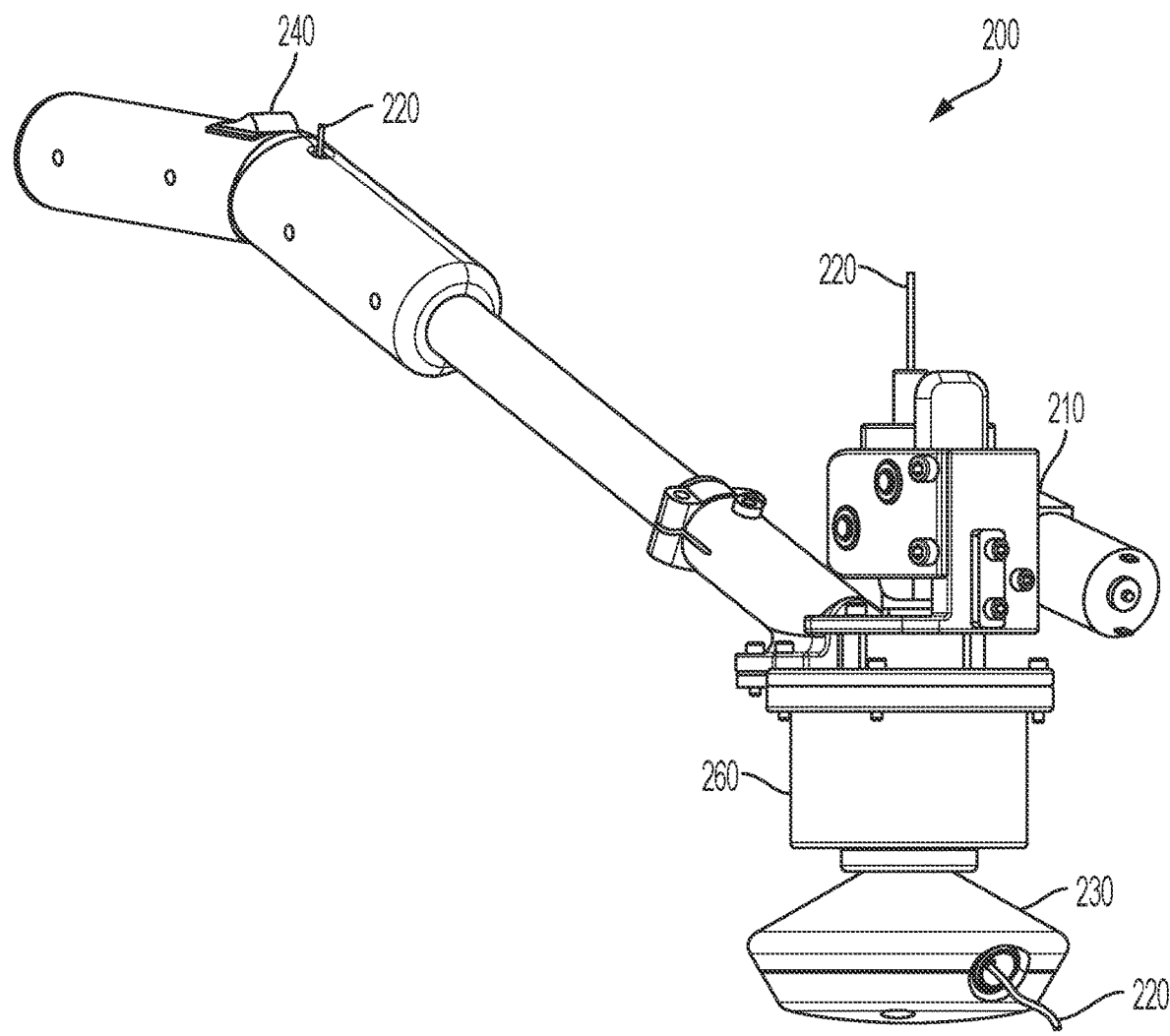
FIG. 3 illustrates a second side view of the first example embodiment of the single line trimmer, according to various aspects discussed herein.
Figure 4:
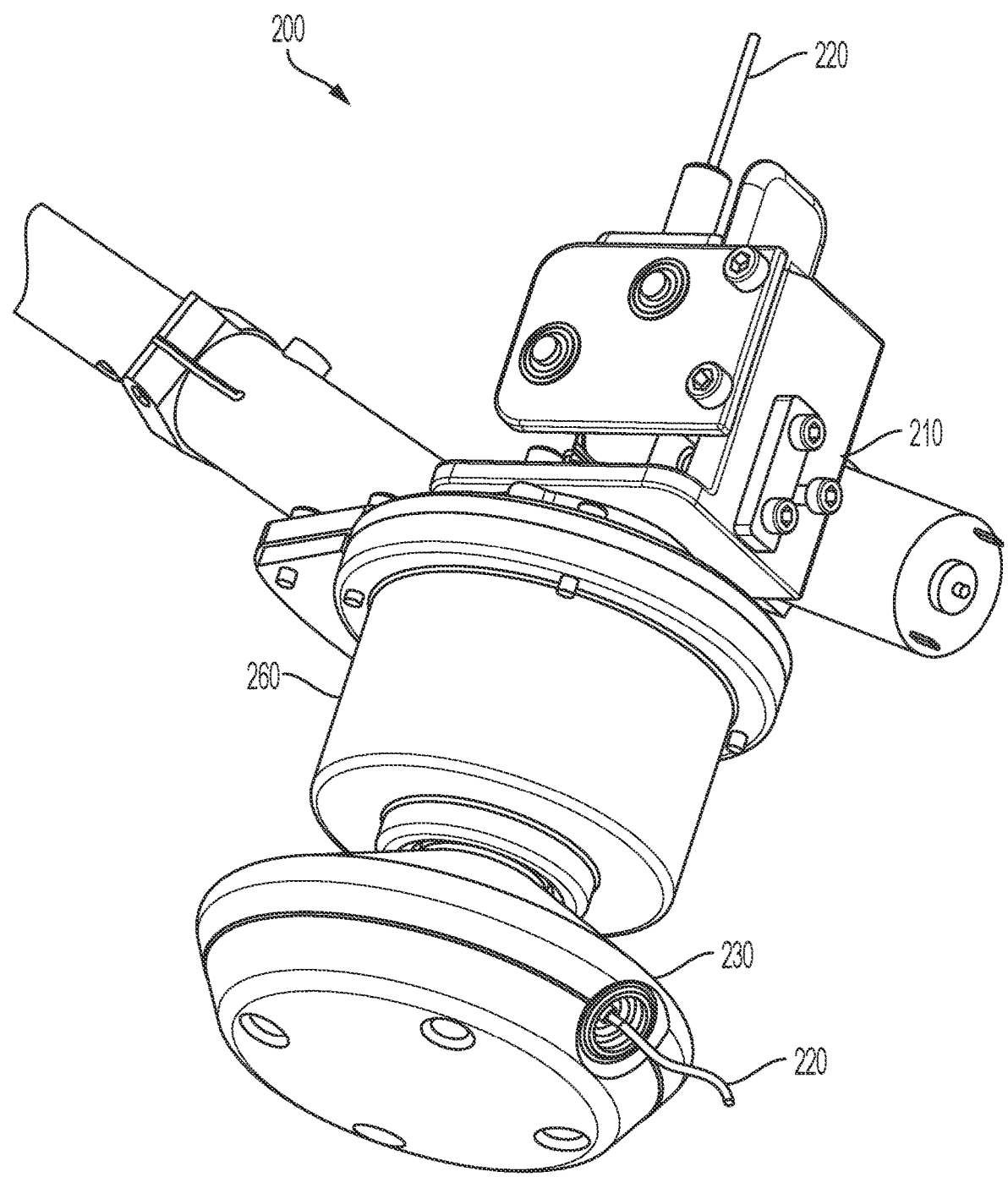
FIG. 4 illustrates a bottom perspective view of the first example embodiment of the single line trimmer, according to various aspects discussed herein.
Figure 5:
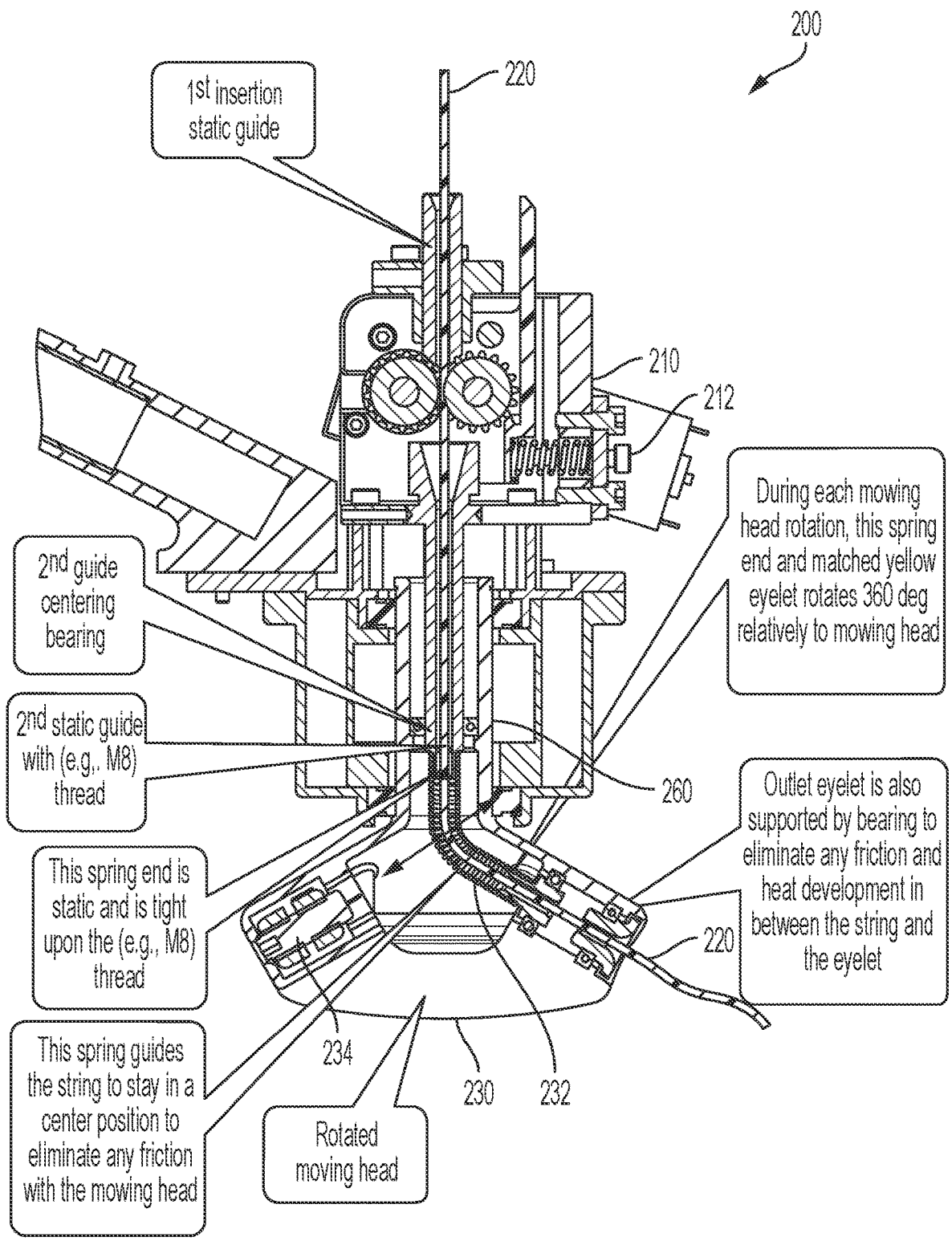
FIG. 5 illustrates a first cutaway view of the first example embodiment of the single line trimmer, according to various aspects discussed herein.
Figure 6:
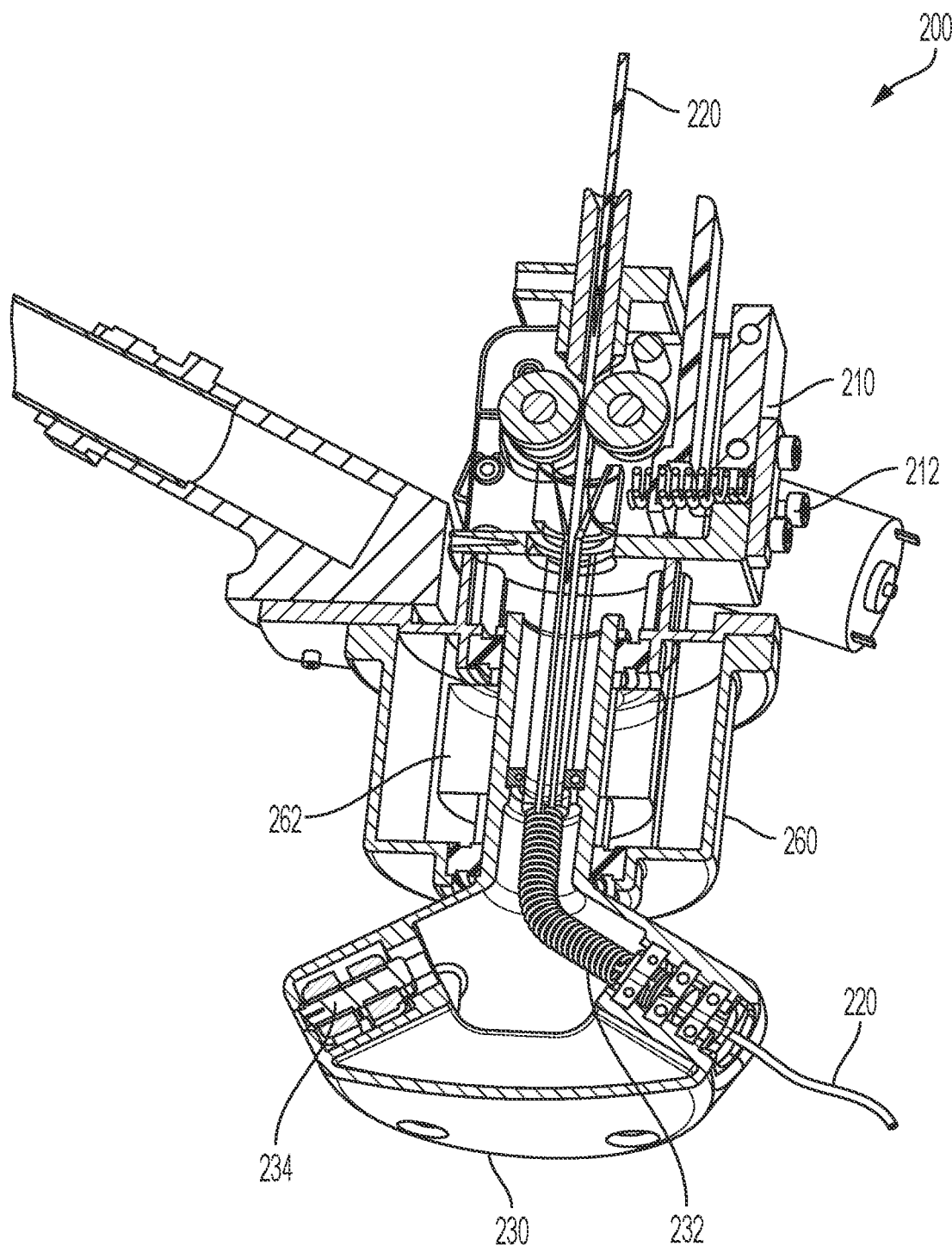
FIG. 6 illustrates a cutaway bottom perspective view of the first example embodiment of the single line trimmer, according to various aspects discussed herein.

FIGS. 2-6 illustrate multiple views of a first example embodiment 200 of a single line trimmer according to various aspects discussed herein. Referring to FIG. 2, illustrated is a first side view of the first example embodiment 200 of the single line trimmer, according to various aspects discussed herein. Referring to FIG. 3, illustrated is a second side view of the first example embodiment 200 of the single line trimmer, according to various aspects discussed herein. Referring to FIG. 4, illustrated is a bottom perspective view of the first example embodiment 200 of the single line trimmer, according to various aspects discussed herein. Referring to FIG. 5, illustrated is a first cutaway view of the first example embodiment 200 of the single line trimmer, according to various aspects discussed herein. Referring to FIG. 6, illustrated is a cutaway bottom perspective view of the first example embodiment 200 of the single line trimmer, according to various aspects discussed herein. While not shown in FIGS. 2-6 for ease of illustration and discussion, first example embodiment can also include a debris shield around the trimmer head 230.

First example embodiment 200 is an example handheld single line trimmer, although various embodiments can also be mounted on outdoor power equipment. First example embodiment 200 comprises a continuous line feed mechanism 210 (e.g., a pair of wheels or gears driven by a line feed motor, etc.), trimmer line 220 (e.g., which can be fed into continuous line feed mechanism 210, and can optionally be fed through the handle and hollow shaft of the handheld trimmer, as indicated by an optional end of trimmer line 220 shown on the handle of example embodiment 200, etc.) and a hollow shaft (e.g., hollow shaft 262 of the trimmer motor 260, etc.), trimmer head 230 (showing a cutting end of trimmer line 220 that can be used for trimming and/or edging of weeds and/or vegetation, etc.), user controls 240 (e.g., which can control activation of continuous line feed mechanism 210 and/or activation of trimmer motor 260, etc.), and trimmer motor 260 (e.g., which can drive rotation of trimmer head 230, and which can have a hollow shaft rotor 262 through which trimmer line 220 can pass (as shown in FIGS. 5 and 6), etc.).

The cutaway views of FIGS. 5 and 6 illustrate additional details of the first example embodiment 200. As shown in FIGS. 5 and 6, continuous line feed mechanism 210 can comprise a release mechanism 212 to allow for loading, unloading, or replacement of trimmer line 220. Although a specific release mechanism 212 is shown in the first example embodiment (e.g., involving a spring and a button to move a lever, allowing gears of continuous line feed mechanism 210 that are holding trimmer line 220 to separate), various embodiments can employ the same or another mechanism (or no mechanism at all) to facilitate loading, unloading, or replacement of trimmer line 220.

As can be seen in FIGS. 5 and 6 (and as noted in FIG. 5), static guides and/or bearings can be employed to align and/or allow rotation of trimmer line 220 as it passes into and through continuous line feed mechanism 210, trimmer motor 260 (e.g., which can have a hollow shaft rotor 262 for trimmer line 220 to pass through, etc.), and trimmer head 230. Additionally, trimmer head 230 can comprise a spring 232 that can guide trimmer line 220 to an eyelet of trimmer head 230 while allowing trimmer line 220 to move freely with reduced friction. Spring 232 can be secured and static at one end (e.g., as aligned with the threading shown in FIG. 5, or otherwise secured, etc.) and can be allowed to rotate at the other end (e.g., via the bearings shown in FIG. 5, etc.), to undo torsion that would otherwise result from rotation of trimmer head 230.

FIGS. 5 and 6 also illustrate counterweight 234, which can be included in trimmer head 230 to ensure that trimmer head 230 is balanced as it rotates.

Figure 7:
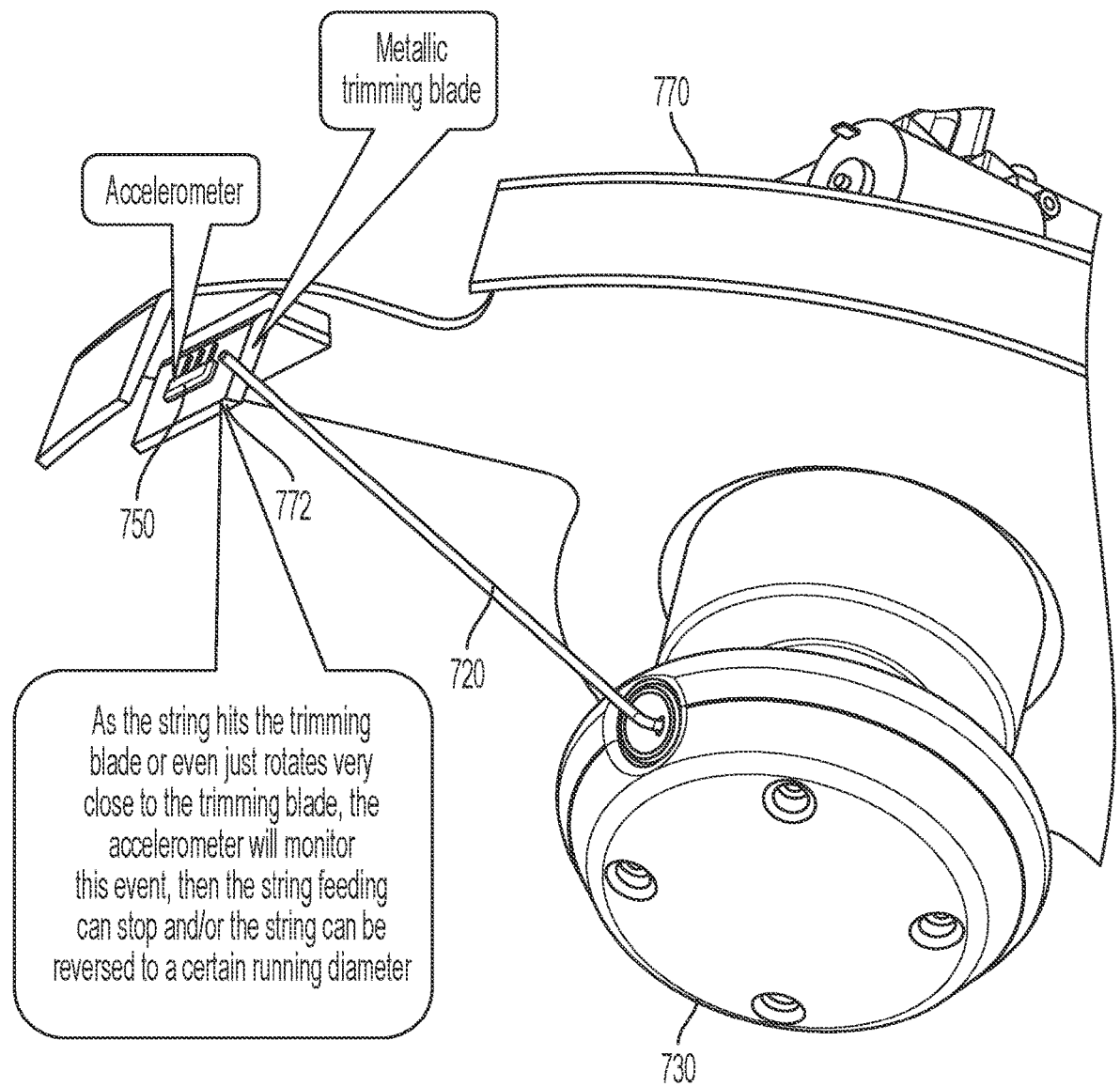
FIG. 7 illustrates a diagram showing an example vibration sensor that can be employed as a line diameter detection sensor in connection with various embodiments discussed herein.

Referring to FIG. 7, illustrated is a diagram showing an example vibration sensor that can be employed as a line diameter detection sensor in connection with various embodiments discussed herein. FIG. 7 shows an accelerometer 750 employed as a vibration sensor to detect when the trimmer line 720 is long enough (e.g., to automatically stop feeding trimmer line via a continuous line feed mechanism, etc.). In the embodiment shown in FIG. 7, accelerometer 750 can be mounted on or near (or at a comparable distance from the center of trimmer head 730) a trimming blade (e.g., metal, ceramic, etc.) 772 on debris shield 770 for cutting excess trimmer line 720, when the trimming blade 772 or other mounting surface for accelerometer 750 is struck by (or has pass near) trimmer line 720, accelerometer 750 can detect the resulting acceleration and/or vibration and a determination can be made that trimmer line 720 is long enough (e.g., and a continuous line feed mechanism can be shut off in response, and can optionally retract trimmer line 120 a short distance, etc.). As discussed above, in various aspects, spectral analysis can be employed to distinguish random impacts (e.g., of lawn debris) from the trimmer line, which rotates at a known frequency.

Figure 8:
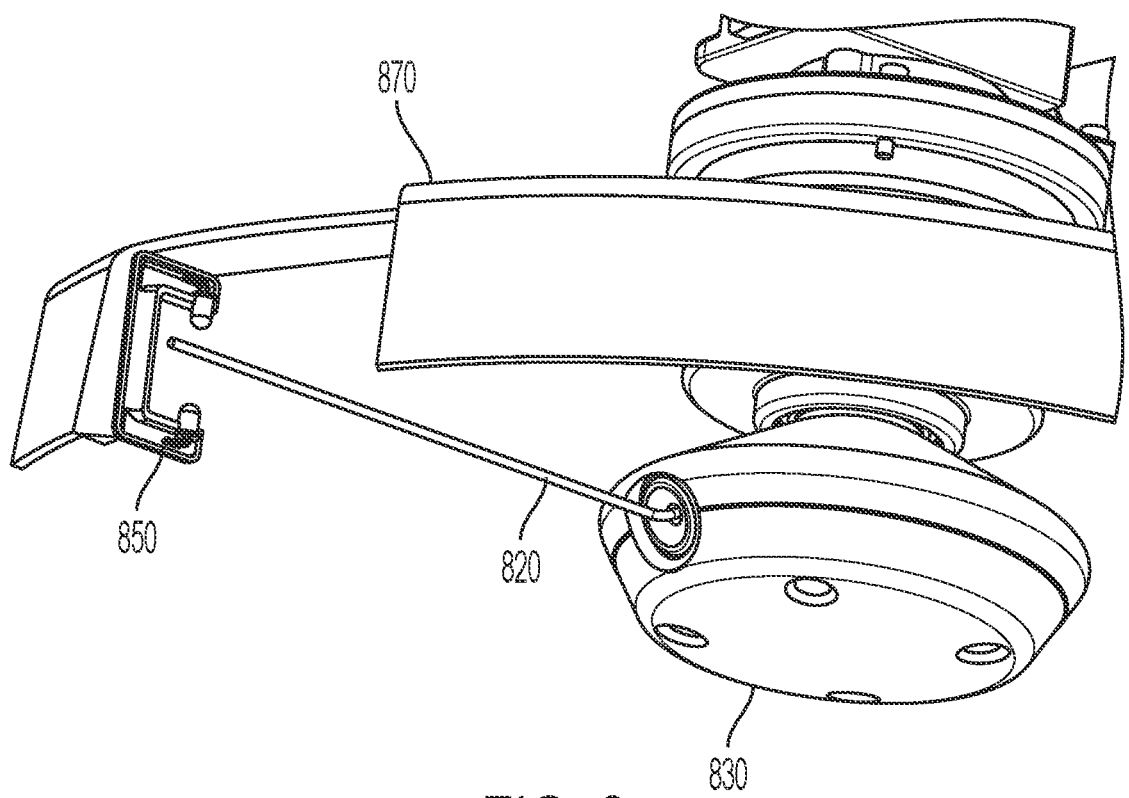
FIG. 8 illustrates a diagram showing an example optical sensor that can be employed as a line diameter detection sensor in connection with various embodiments discussed herein.

Referring to FIG. 8, illustrated is a diagram showing an example optical sensor that can be employed as a line diameter detection sensor in connection with various embodiments discussed herein. FIG. 8 shows an optical (e.g., light emitting diode (LED), etc.) gate sensor 850 that can be employed to detect when the trimmer line 820 is long enough (e.g., to automatically stop feeding trimmer line via a continuous line feed mechanism, etc.). As shown in FIG. 8, optical gate sensor 850 can be placed on or near an outer edge of debris shield 870, to detect when trimmer line 820 is of sufficient length to be detected by sensor 850. Because of the potential for debris to be sensed by optical gate sensor 850 (and because the trimmer line 820 will only be present in optical gate sensor 850 very briefly during each rotation of trimmer head 830), spectral analysis can be employed (e.g., based on a known frequency of rotation of trimmer head 830) to improve the accuracy of determination of whether trimmer line 820 is of sufficient length.

Figure 9:
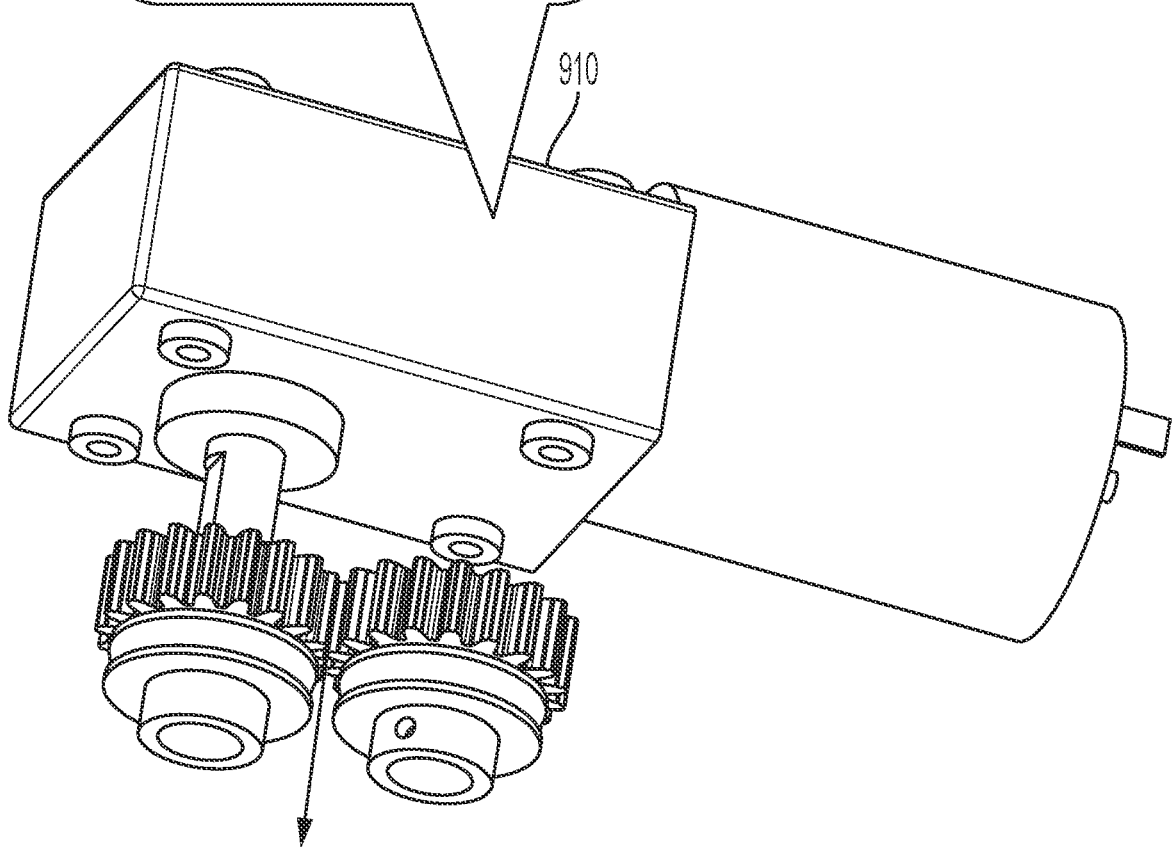
FIG. 9 illustrates an example continuous line feed mechanism with an optional locking mechanism, in connection with various aspects discussed herein.
Figure 10:
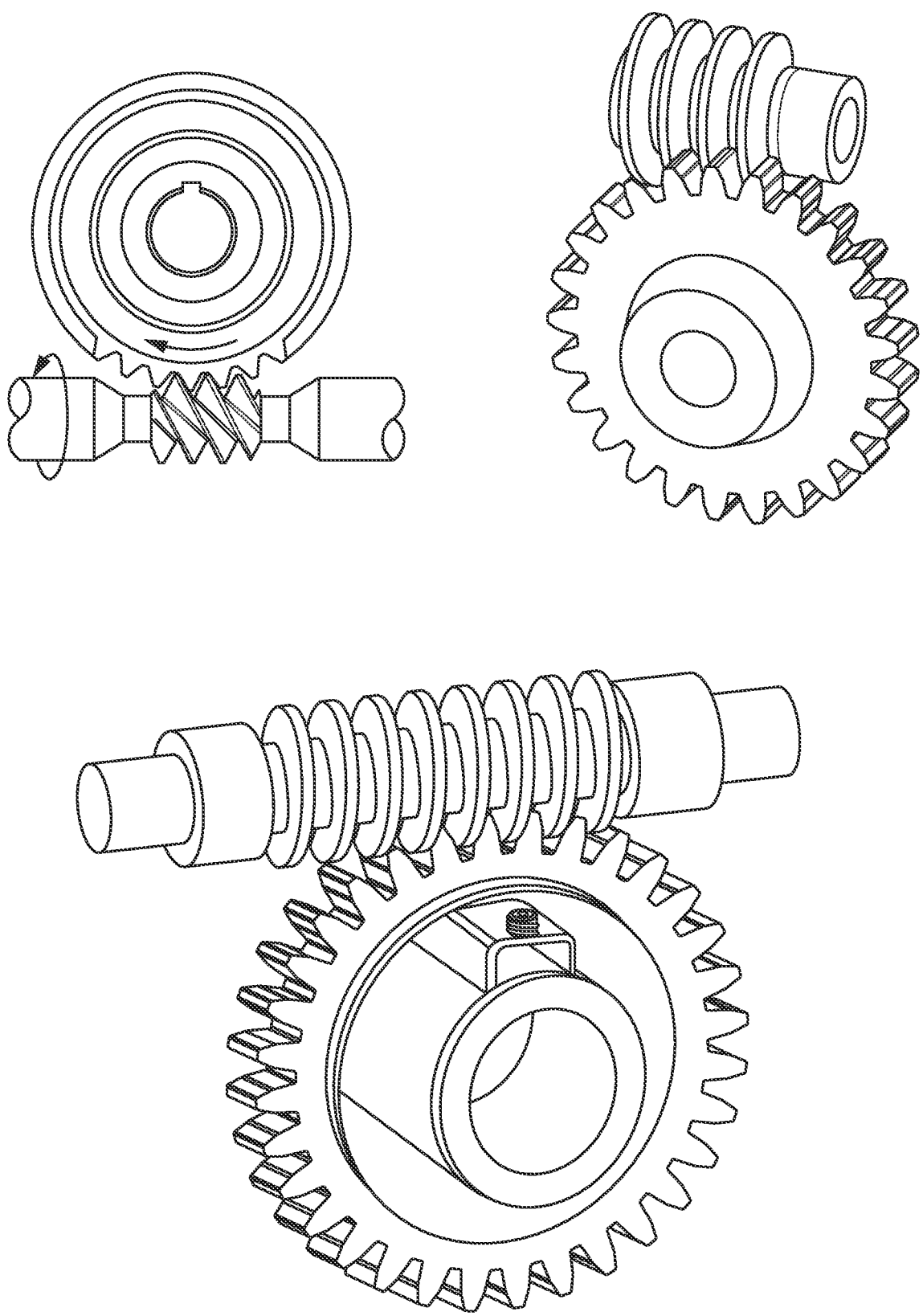
FIG. 10 illustrates images of example self-locking worm gears that can be employed in connection with various embodiments discussed herein.

Referring to FIG. 9, illustrated is an example continuous line feed mechanism 910 with an optional locking mechanism, in connection with various aspects discussed herein. Because various embodiments can employ a continuous line feed mechanism (e.g., 110, 910, etc.) instead of line feed as in existing line trimmers (e.g., bump feeders, etc.), there is the potential that the trimmer line can develop high centrifugal forces and/or wrap around obstacles such that a large force can be applied to the trimmer line to pull it out of the single line trimmer. Accordingly, various embodiments can employ a locking mechanism such as a self-locking worm gear or other "no back" mechanism to prevent the trimmer line from being pulled out of the line trimmer by such forces. Referring to FIG. 10, illustrated are images of example self-locking worm gears that can be employed in connection with various embodiments discussed herein.

Figure 11:
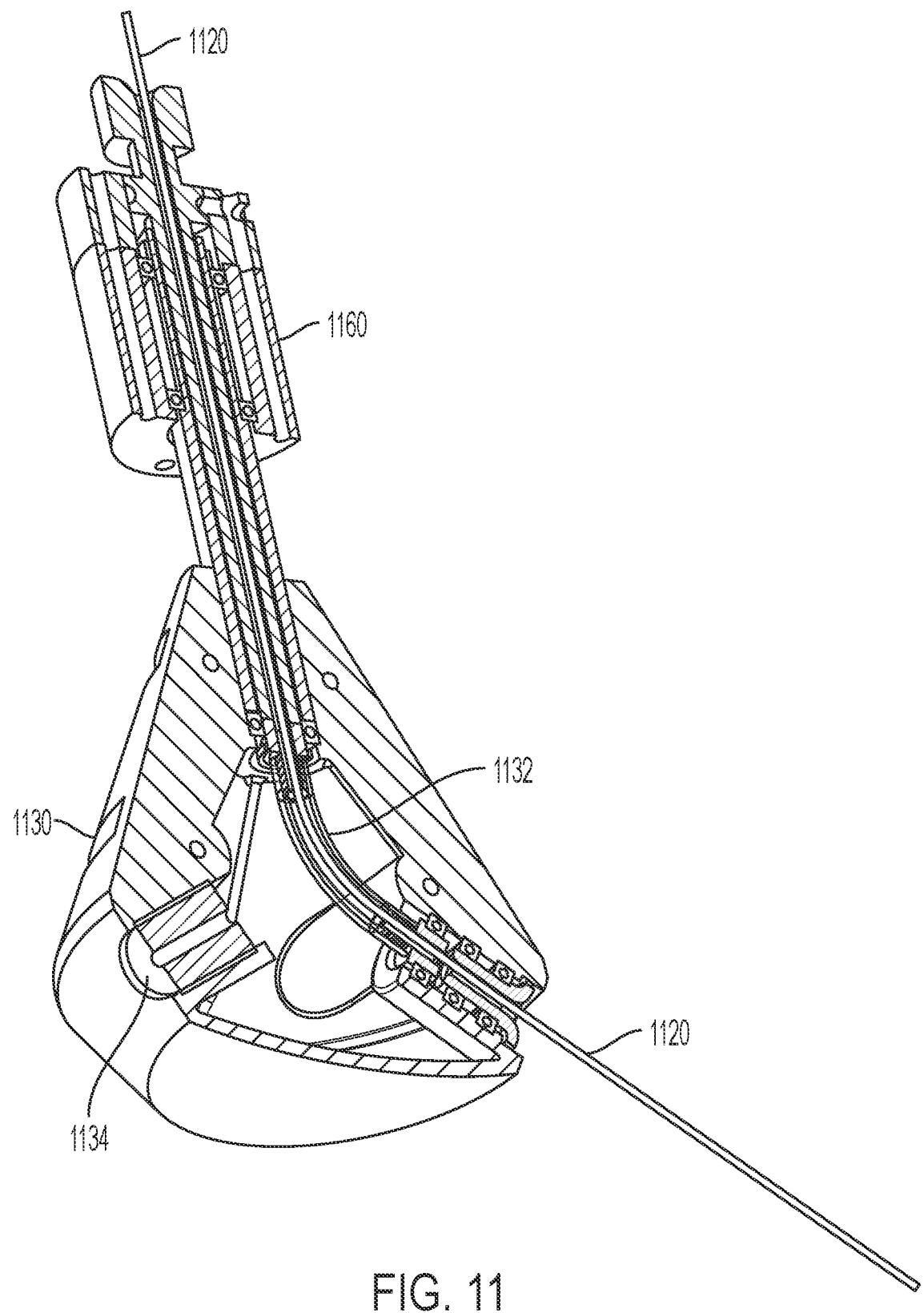
FIG. 11 illustrates a trimmer motor and trimmer head of an alternative embodiment of a line trimmer, according to various aspects discussed herein.

Referring to FIG. 11, illustrated are a trimmer motor 1160 and trimmer head 1130 of an alternative embodiment of a line trimmer, according to various aspects discussed herein. Trimmer head 1130 has an alternative shape from trimmer heads 230 and 730, but can contain a spring 1132 and counterweight 1134, which can be similar to spring 232 and counterweight 234, respectively, discussed above.

Figure 12:
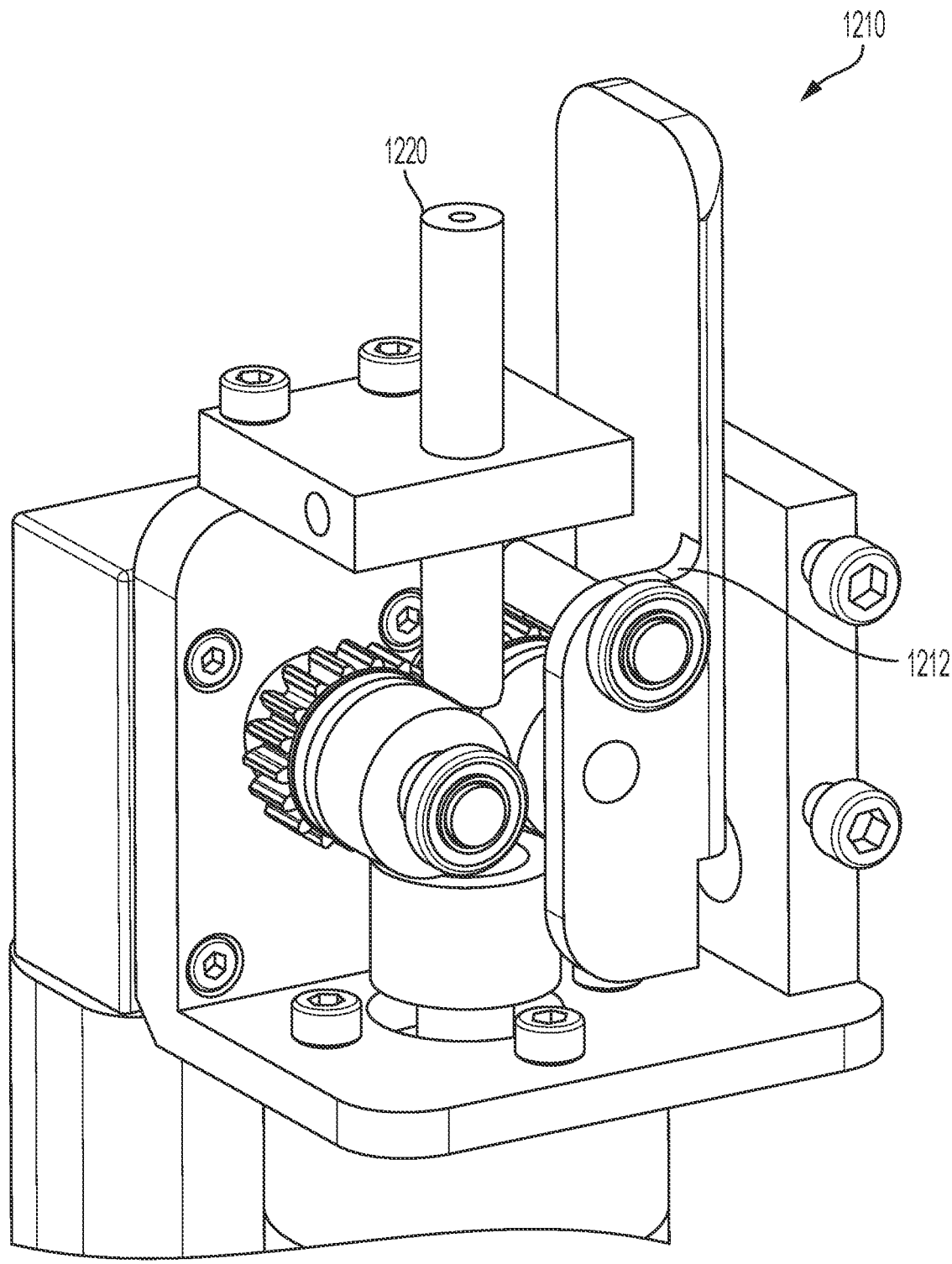
FIG. 12 illustrates a continuous line feed mechanism of the alternative embodiment of the single line trimmer showing a line release mechanism for releasing trimmer line, according to various aspects discussed herein.

Referring to FIG. 12, illustrated is a continuous line feed mechanism 1210 of the alternative embodiment of the single line trimmer showing a line release mechanism 1212 for releasing trimmer line 1220, according to various aspects discussed herein.

In regard to the various functions performed by the above described components, machines, devices, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as electronic hardware configured to implement the functions, or a computer-readable medium having computer-executable instructions for performing the acts or events of the various processes.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In other embodiments, combinations or sub-combinations of the above disclosed embodiments can be advantageously made. The block diagrams of the architecture and flow charts are grouped for ease of understanding. However, it should be understood that combinations of blocks, additions of new blocks, re-arrangement of blocks, and the like are contemplated in alternative embodiments of the present disclosure.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A weed and vegetation trimmer, comprising:
   a trimmer head configured to rotate a portion of a trimmer line comprising a cutting end of the trimmer line;
   a trimmer motor configured to drive rotation of the trimmer head;
   a continuous line feed mechanism secured to the trimmer motor and configured to continuously feed the trimmer line into the trimmer head by a line feed motor while the continuous line feed mechanism is active, wherein the continuous line feed mechanism comprises a pair of wheels or a pair of gears that grip the trimmer line in place and comprises a release mechanism that facilitates release of the pair of wheels or pair of gears from the trimmer line; and
   one or more line feed activation mechanisms configured to control an activation and a deactivation of the line feed motor of the continuous line feed mechanism, wherein the release mechanism comprises a spring to maintain the pair of wheels or pair of gears in contact with the trimmer line and a lever or button to separate the pair of wheels or pair of gears from the trimmer line.

2. The weed and vegetation trimmer of claim 1, wherein the one or more line feed activation mechanisms comprise a manual line feed activation mechanism positioned on an operator handle of the weed and vegetation trimmer and configured to control the activation and the deactivation of the line feed motor of the continuous line feed mechanism.

3. The weed and vegetation trimmer of claim 1, wherein the one or more line feed activation mechanisms comprise an automatic line feed activation mechanism configured to control the activation and the deactivation of the line feed motor of the continuous line feed mechanism.

4. The weed and vegetation trimmer of claim 3, further comprising at least one sensor configured to detect whether the cutting end of the trimmer line has at least a threshold length, wherein the automatic line feed activation mechanism is configured to deactivate the line feed motor of the continuous line feed mechanism when the cutting end of the trimmer line has at least the threshold length.

5. The weed and vegetation trimmer of claim 4, wherein the automatic line feed activation mechanism is configured to deactivate the line feed motor of the continuous line feed mechanism when the cutting end of the trimmer line has less than the threshold length.

6. The weed and vegetation trimmer of claim 4, wherein the at least one sensor comprises at least one of an optical sensor, a vibration sensor, or an acoustic sensor.

7. The weed and vegetation trimmer of claim 6, further comprising a trimming blade configured to trim excess length from the trimmer line, wherein the at least one sensor is mounted on or near the trimming blade.

8. The weed and vegetation trimmer of claim 1, wherein the line feed motor is configured to drive the one of the pair of wheels or the pair of gears and feed the trimmer line into the trimmer head.

9. The weed and vegetation trimmer of claim 1, wherein the trimmer head comprises a spring configured to guide the cutting end of the trimmer line to an eyelet of the trimmer head.

10. The weed and vegetation trimmer of claim 9, wherein the trimmer head comprises a set of spring bearings configured to facilitate rotation of an end of the spring closest to the eyelet.

11. The weed and vegetation trimmer of claim 1, wherein the trimmer head comprises a counterweight to balance the trimmer head by offsetting the cutting end of the trimmer line.

12. The weed and vegetation trimmer of claim 1, wherein the trimmer motor comprises a hollow shaft, wherein the continuous line feed mechanism is configured to feed the trimmer line into and through the hollow shaft and out from the hollow shaft into the trimmer head via the hollow shaft.

13. The weed and vegetation trimmer of claim 12, wherein the trimmer head comprises a spring extending from an inlet of the trimmer head to an outlet of the trimmer head and is configured to receive the trimmer line from the hollow shaft of the trimmer motor at the inlet of the trimmer head and guide the trimmer line from the inlet to an outlet eyelet located at the outlet of the trimmer head.

* * * * *